United States Patent [19]

Wilson et al.

[11] 4,079,969
[45] Mar. 21, 1978

[54] SWIVEL CONNECTOR
[75] Inventors: Fred A. Wilson, Florence, Ky.;
Charles W. Taylor, Batavia, Ohio
[73] Assignee: Dover Corporation, New York, N.Y.
[21] Appl. No.: 657,716
[22] Filed: Feb. 13, 1976
[51] Int. Cl.² .............................................. F16L 17/00
[52] U.S. Cl. ....................................... 285/98; 285/45;
285/276
[58] Field of Search ................. 285/276, 281, 98, 272,
285/273, 274, 275, 277, 278, 279, 280, 282, 190,
45

[56] References Cited
U.S. PATENT DOCUMENTS

| 2,525,652 | 10/1950 | Cuningham | 285/281 |
| 3,002,769 | 10/1961 | Deubler et al. | 285/98 X |
| 3,177,012 | 4/1965 | Faccou | 285/281 X |
| 3,889,983 | 6/1975 | Freize | 285/98 |

FOREIGN PATENT DOCUMENTS 978,461   12/1964   United Kingdom ................. 285/281

Primary Examiner—Dave W. Arola
Attorney, Agent, or Firm—John G. Schenk

[57] ABSTRACT

A swivel connector between a flexible hose and a nozzle has a reduced portion of a first body secured to the nozzle and an enlarged portion of a second body secured to the hose with the first and second bodies, which have an enlarged portion of the first body overlapping a reduced portion of the second body, providing aligned passages therethrough to provide communication between the hose and the nozzle. A plastic thrust bearing is disposed between a metallic ring secured by set screws to the enlarged portion of the first body and a metallic ring mounted by flats on the ring cooperating with flats on the reduced portion of the second body so that each of the rings rotates with the body to which it is connected. The thrust bearing has a first face, which is perpendicular to the axis or centerline of the aligned passages, engage a substantially parallel face on the metallic ring secured to the first body and a second face, which is substantially parallel to the first face, engage a substantially parallel face on the metallic ring secured to the second body. Thus, all rotation occurs between one of the faces of the thrust bearing and the face on one of the metallic rings. A pair of plastic radial bearings is disposed between the enlarged portion of the first body and the reduced portion of the second body to provide bending support thereto. One of the radial bearings is disposed adjacent the metallic ring secured to the first body while the other radial bearing is disposed adjacent a seal ring which is spaced from the metallic ring secured to the second body and provides the seal between the first and second bodies.

24 Claims, 5 Drawing Figures

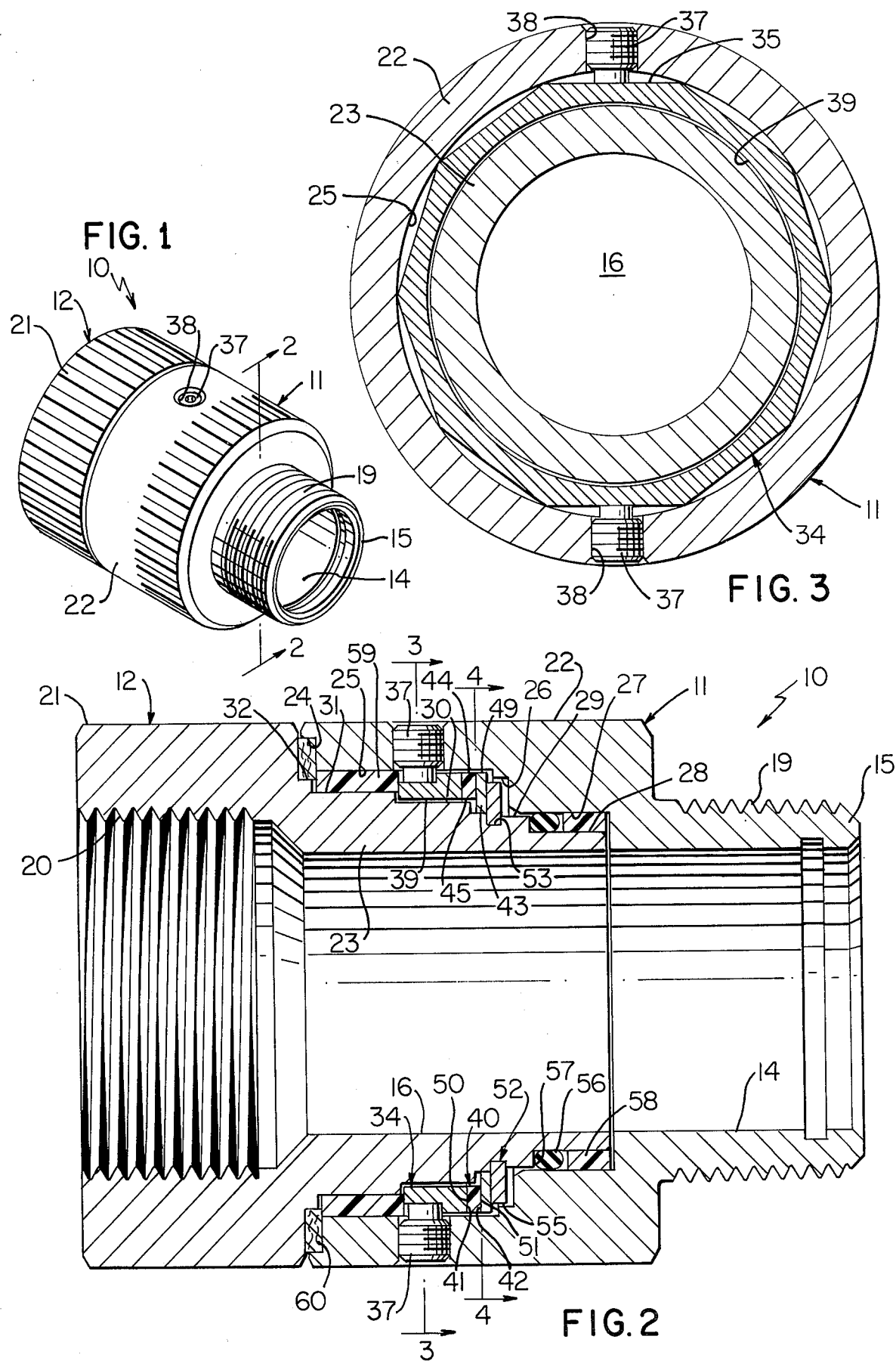

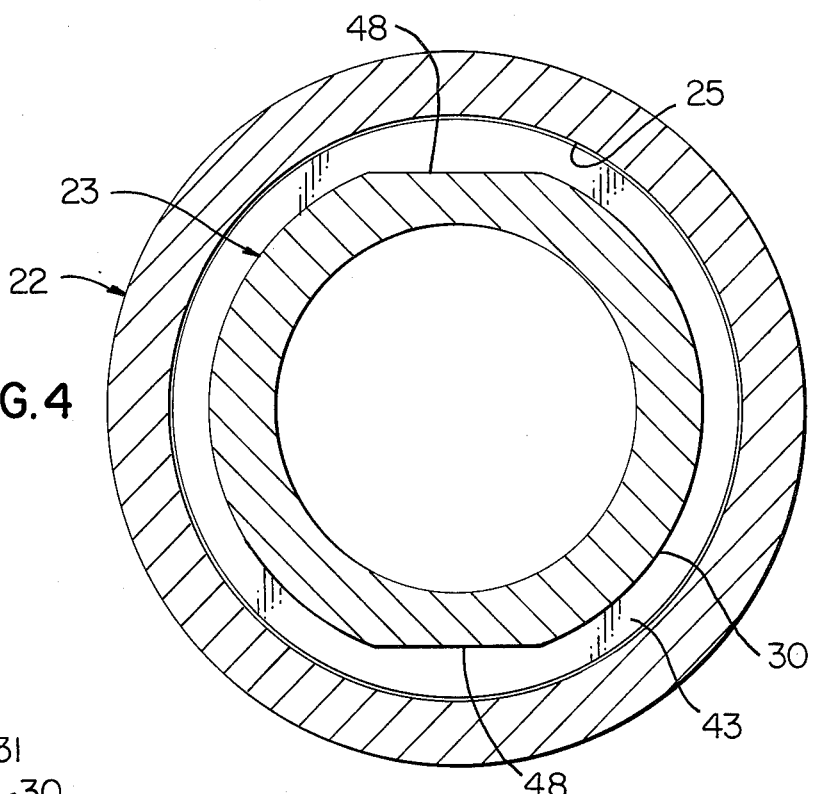
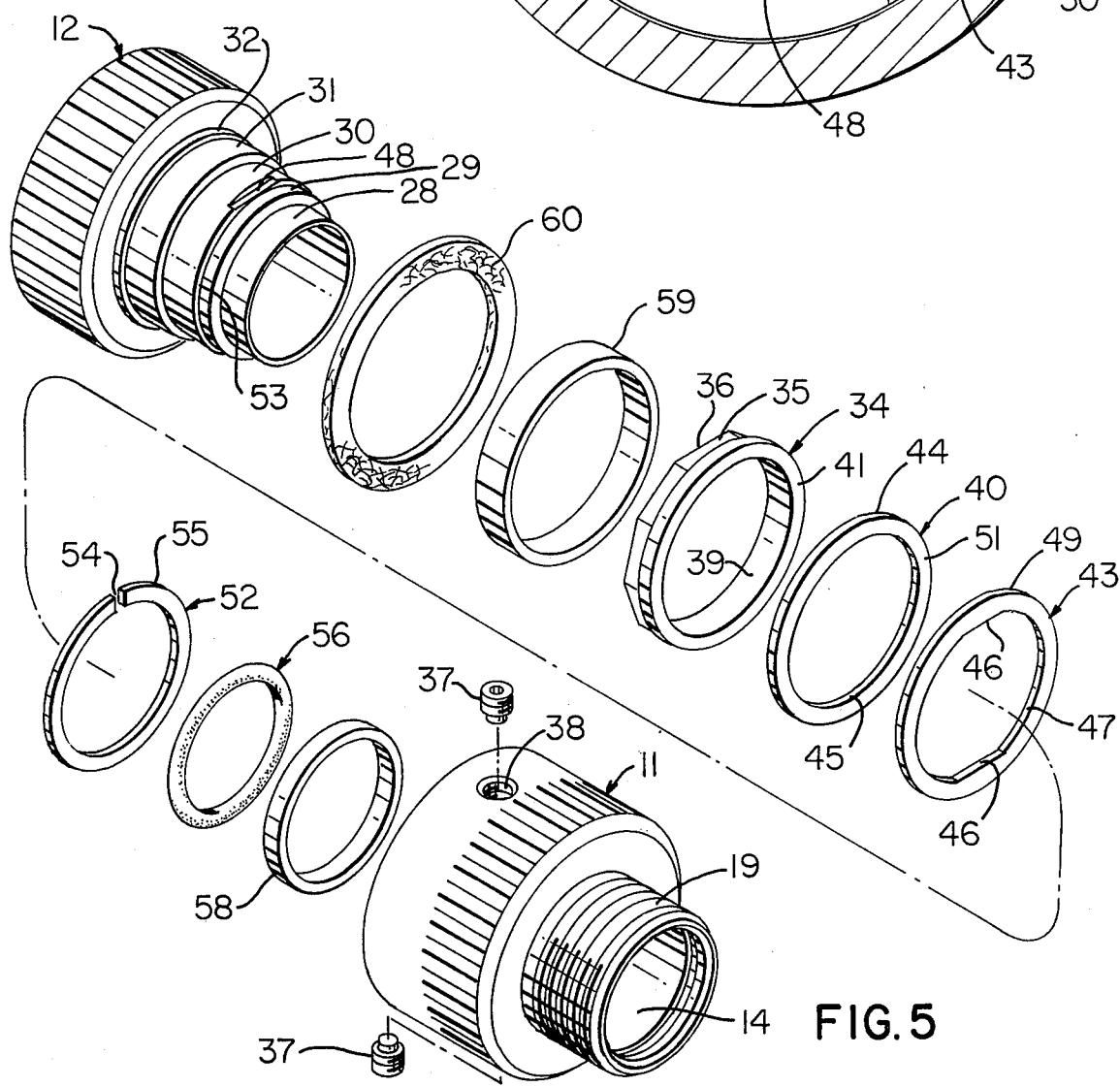

SWIVEL CONNECTOR

When delivering heating oil to a home from a truck, for example, it is necessary to have a relatively long hose extending from the truck and a nozzle connected to the hose to supply the heating oil from the truck to the tank of the home. A swivel connector is desirable between the nozzle and the hose to enable the nozzle to be inserted within the fill pipe for the tank at the home.

In a prior swivel connector, a first body has been connected to the nozzle and a second body has been connected to the hose. A retaining ring has been utilized to hold a metallic ring on one of the bodies against a metallic ring on the other of the bodies. As a result, this retaining ring, which has been mounted in a groove on one of the bodies, has been subjected to thrust loads so as to wear and eat away a shoulder of the groove to produce metal chips. These metal chips have destroyed the seal ring, which seals between the two bodies.

Furthermore, this seal ring has previously been subjected to non-uniform loads because of the use of only a single radial bearing, which has been remote from the seal ring. This has resulted in it being necessary to replace the seal ring at relatively short periods of time. Furthermore, the wearing away of the shoulder of the groove has necessitated replacement of the body having the groove.

The present invention satisfactorily solves the foregoing problems through providing a swivel connector in which there is no metal to metal contact between the two bodies forming the swivel connector. The present invention accomplished this through utilizing a non-metallic thrust bearing, which is preferably plastic, between metallic means mounted on each of the two bodies. The thrust bearing prevents any rotating force from being applied to the retaining ring in the groove so that it does not turn in the groove whereby it cannot cause wearing away of the shoulder of the groove so as to damage the seal ring.

Furthermore, by the retaining ring not rotating in the groove of the body in which it is mounted so as not to wear away the shoulder of the groove, there is no necessity to have to replace the body having the groove under normal operating conditions. Thus, this reduces the cost of replacement parts for the swivel connector.

The present invention also provides a non-metallic radial bearing at the distal end of each of the bodies. This aids in distributing the bending forces on the two bodies.

Additionally, a more uniform load is applied to the seal ring with the swivel connector of the present invention because of the use of one of the non-metallic radial bearings adjacent the seal ring. Thus, the life of the seal ring of the present invention is extended not only by the absence of any metal chips but also by the seal ring being subjected to more uniform loads.

An object of this invention is to provide an improved swivel connector.

Another object of this invention is to provide a swivel connector having a seal with a longer life.

A further object of this invention is to provide a swivel connector in which there is no metal to metal contact between any rotating parts of the swivel connector.

Other objects, uses, and advantages of this invention are apparent upon a reading of this description, which proceeds with reference to the drawings forming part thereof and wherein:

FIG. 1 is a perspective view of the swivel connector of the present invention.

FIG. 2 is a longitudinal sectional view of the swivel connector of the present invention and taken along line 2—2 of FIG. 1.

FIG. 3 is a cross sectional view of a portion of the swivel connector of the present invention and taken along line 3—3 of FIG. 2.

FIG. 4 is a cross sectional view of another portion of the swivel connector of the present invention and taken along line 4—4 of FIG. 2.

FIG. 5 is an exploded perspective view of the swivel connector of the present invention.

Referring to the drawings and particularly FIG. 1, there is shown a swivel connector 10 including a first body 11 and a second body 12. The bodies 11 and 12 are rotatably connected to each other.

As shown in FIG. 2, the first body 11 has a longitudinal passage 14 in a reduced portion 15. The passage 14 is aligned with a longitudinal passage 16 extending through the second body 12.

The passage 14 communicates with a passage in a nozzle (not shown). The nozzle is secured to the first body 11 by having threads cooperate with external threads 19 on the reduced portion 15 of the first body 11.

The second body 12 has internal threads 20 in the portion of the passage 16 within an enlarged portion 21 of the second body 12 to receive a threaded end of a flexible hose (not shown). The flexible hose leads to a truck, for example, from which heating oil is supplied to the passage 16. The heating oil flows from the passage 16 through the passage 14 and the passage in the nozzle to a fill pipe of a tank for a home, for example.

The first body 11 has an enlarged portion 22 disposed in overlapping relation to a reduced portion 23 of the second body 12. The enlarged portion 22 of the first body 11 has its inner surface always radially spaced from the outer surface of the reduced portion 23 of the second body 12 as shown in FIG. 2 to prevent any metal to metal contact therebetween.

The enlarged portion 22 of the first body 11 is formed with stepped bores 24, 25, 26, and 27 therein. The bores 24, 25, 26, and 27 and the passage 14 form an axial bore extending through the first body 11 with the passage 14 having a smaller diameter than any of the bores 24, 25, 26, and 27. The bore 24, which is the largest of the four stepped bores 24, 25, 26, and 27, is adjacent the distal end of the first body 11 while the bore 27, which is the smallest of the four stepped bores 24, 25, 26, and 27, is closest to the reduced portion 15 of the first body 11.

The second body 12 has a plurality of stepped outer surfaces 28, 29, 29', 30, 31, and 32 formed thereon. The outer surface 28, which has the smallest diameter of the outer surface, is at the distal end of the reduced portion 23 of the second body 12 and has its entire length opposite the bore 27 in the enlarged portion 22 of the first body 11.

The length of the outer surface 29, which has a larger diameter than the outer surface 28, has a portion disposed opposite a portion of the length of the bore 27 in the enlarged portion 22 of the first body 11, a portion opposite the entire length of the bore 26 in the enlarged portion 22 of the first body 11, and a portion opposite a portion of the length of the bore 25 in the enlarged portion 22 of the body 11. The entire length of the outer surface 29', which has a larger diameter than the outer surface 29, of the second body 12 and the entire length of the outer surface 30, which has a larger diameter than the outer surface 29', of the second body 12 extend opposite a portion of the length of the bore 25 in the enlarged portion 22 of the first body 11.

The outer surface 31, which has a larger diameter than the outer surface 30, extends for most of its length opposite a portion of the length of the bore 25 in the enlarged portion 22 of the first body 11 but also has a portion of its length opposite a portion of the length of the bore 24 in the enlarged portion 22 of the first body 11 adjacent the distal end. A portion of the length of the outer surface 32, which has the largest diameter of the outer surfaces, of the second body 12 is opposite a portion of the length of the bore 24 in the enlarged portion 22 of the first body 11.

An annular retainer 34 is disposed between the outer surface 30 of the second body 12 and a portion of the bore 25 in the enlarged portion 22 of the first body 11 and is secured to the first body 11 for rotation therewith. The metallic retainer 34 has a plurality of flats 35 (see FIGS. 3 and 5) along a reduced portion 36.

A pair of set screws 37 is threaded into a pair of diametrically disposed threaded openings 38 in the enlarged portion 22 of the first body 11 to engage two of the flats 35, which are diametrically disposed, on the retainer 34. This secures the retainer 34 to the first body 11 for rotation therewith.

As shown in FIG. 2, the retainer 34 has its inner surface 39 radially spaced from the outer surface 30 of the reduced portion 23 of the second body 12. Thus, there is not contact between the retainer 34 and the second body 12.

A thrust bearing 40, which is formed of a suitable plastic such as acetal plastic, for example, is disposed between a face 41 of the retainer 34 and a face 42 of a metallic D-ring 43. The thrust bearing 40 has its outer surface 44 slightly spaced from the bore 25 in the enlarged portion 22 of the first body 11. The thrust bearing 40 has a portion of its inner surface 45 engaging the outer surface 30 of the reduced portion 23 of the second body 12.

The D-ring 43 has a pair of diametrically disposed flats 46 (see FIG. 5) on its inner surface 47 for engagement with a pair of diametrically disposed flats 48 (see FIGS. 4 and 5) on the outer surface 29' of the reduced portion 23 of the second body 12. Thus, the D-ring 43 is mounted on the second body 12 for rotation therewith. The D-ring 43 has its outer surface 49 radially spaced slightly from the bore 25 in the enlarged portion 22 of the first body 11 to prevent any metal to metal contact therebetween.

The thrust bearing 40 is held between the retainer 34 and the D-ring 43 so that its face 50 (see FIG. 2), which is substantially perpendicular to the axis or centerline of the passages 14 and 16, bears against the adjacent face 41 of the retainer 34 while its face 51, which is substantially parallel to the face 50, engages the adjacent face 42 of the D-ring 43. The thrust bearing 40 is held in this position through a retaining ring 52 being disposed in a groove 53 in the outer surface 29 of the reduced portion 23 of the second body 12.

The retaining ring 52 has a slot 54 (see FIG. 5) therein to enable the retaining ring 52 to be disposed in the groove 53. The retaining ring 52 has its outer surface 55 (see FIG. 2) closer to the bore 26 in the enlarged portion 22 of the first body 11 than the depth of the groove 53 in the outer surface 29 of the reduced portion 23 of the second body 12. This insures that the retaining ring 52 remains within the groove 53 at all times.

A seal ring 56 is disposed between the outer surface 28 of the reduced portion 23 of the second body 12 and the bore 27 in the enlarged portion 22 of the first body 11 to form a fluid seal therebetween. The seal ring 56 bears against a shoulder 57, which is formed at the junction of the outer surfaces 28 and 29 of the reduced portion 23 of the second body 12. The seal ring 56 prevents any fuid leakage between the first body 11 and the second body 12.

A radial bearing 58 is disposed at the distal end of the second body 12 between the outer surface 28 of the reduced portion 23 of the second body 12 and the bore 27 in the enlarged portion 22 of the first body 11. A second radial bearing 59 is disposed between the bore 25 in the enlarged portion 22 of the first body 11 and the outer surface 31 of the reduced portion 23 of the second body 12. The radial bearings 58 and 59, which are formed of a suitable plastic such as acetal plastic, for example, provide support against bending for the first body 11 and the second body 12.

The radial bearing 58 has a light press fit within the bore 27 in the enlarged portion 22 of the first body 11. Similarly, the radial bearing 59 has a light press fit on the outer surface 31 of the reduced portion 23 of the second body 12.

A dust seal 60, which is preferably formed of felt, is positioned between the bore 24 in the enlarged portion 22 of the first body 11 and the outer surface 32 of the reduced portion 23 of the second body 12. The outer surface of the dust seal 60 is close to the outer surface of each of the first body 11 and the second body 12 to prevent any dirt from entering therebetween.

With the first body 11 connected to the nozzle and the second body 12 connected to the flexible hose, relative rotation between the first body 11 and the second body 12 occurs without any metal to metal contact therebetween. Furthermore, during rotation, the thrust bearing 40 has a rotational force exerted against both of the faces 50 and 51 thereof as there is relative rotation of the thrust bearing 40 with respect to the retainer 34 and/or the D-ring 43.

This arrangement of rotatably connecting the first body 11 and the second body 12 prevents any relative rotation between the D-ring 43 and the retaining ring 52. As a result, the retaining ring 52 is not subject to rotational forces of a magnitude that would break the shoulder of the groove 53 to produce metal chips therefrom.

The radial bearing 58 prevents the seal ring 56 from being subjected to non-uniform loads. Thus, the seal ring 56 has a longer life.

In assembling the swivel connector 10, the dust seal 60 is initially mounted on the second body 12 and then the radial bearing 59 is lightly press fitted thereon. The retainer 34 is then positioned on the second body 12 after which the thrust bearing 40 is disposed on the second body 12. Next, the D-ring 43 is mounted on the second body 12 followed by the retaining ring 52. Thereafter the seal ring 56 is positioned on the second body 12.

With the first body 11 having the radial bearing 58 lightly press fitted in the bore 27, the first body 11 and the second body 12 are pushed towards each other. Then, the two set screws 37 are inserted in the threaded openings 38 to lock the retainer 34 to the first body 11. This completes the assembly of the swivel connector 10.

While the present invention has shown the retainer 34 as having ten of the flats 35 therein, it should be understood that it would be only necessary for the retainer 34 to have two of the flats 35 diametrically disposed to each other since there are only two of the set screws 37. However, the presence of the 10 flats 35 enables easier securing of the retainer 34 to the first body 11.

An advantage of this invention is that it reduces the torque and wear of the bodies of a swivel connector. Another advantage of this invention is that it provides a longer life for a seal between the rotating bodies of a swivel connector. A further advantage of this invention is that there is no metal to metal contact between the rotating bodies of a swivel connector.

For purposes of exemplification, a particular embodiment of the invention has been shown and described according to the best present understanding thereof. However, it will be apparent that changes and modification in the arrangement and construction of the parts thereof may be resorted to without departing from the spirit and scope of the invention.

What is claimed is:

1. A swivel connector including a first body adapted to be connected to a nozzle or the like; a second body adapted to be connected to a hose or the like; said first body having a passage extending therethrough; said second body having a passage extending therethrough and communicating with said passage in said first body to provide an aligned passage therethrough; said first body having an enlarged portion; said second body having a reduced portion for disposition within said enlarged portion of said first body and in radial spaced relation thereto; means to rotatably connect said first body and said second body to each other and disposed between said enlarged portion of said first body and said reduced portion of said second body, said rotatably connecting means including first metallic means secured to the inner surface of said enlarged portion of said first body for rotation therewith and radially spaced from said reduced portion of said second body, second metallic means secured to said reduced portion of said second body for rotation therewith and radially spaced from said enlarged portion of said first body, non-metallic thrust bearing disposed between said first metallic means and said second metallic means and in engagement with each while permitting relative movement therebetween, retaining means supported on said reduced portion of said second body and engaging said second metallic means on a side remote from the side of said second metallic means against which said thrust bearing engages, said retaining means being radially spaced from said enlarged portion of said first body, and radial bearing means disposed between said enlarged portion of said first body and said reduced portion of said second body and in engagement with each; and sealing means disposed between said enlarged portion of said first body and said reduced portion of said second body and in engagement with each.

2. The swivel connector according to claim 1 in which said radial bearing means includes a first radial bearing disposed between said enlarged portion of said first body and said reduced portion of said second body on the side of said first metallic means remote from said thrust bearing and in engagement with said first and second bodies, and a second radial bearing disposed between said enlarged portion of said first body and said reduced portion of said second body on the side of said retaining means remote from said second metallic means and in engagement with said first and second bodies.

3. The swivel connector according to claim 2 in which each of said first and second radial bearings is non-metallic.

4. The swivel connector according to claim 3 in which said sealing means is disposed between said retaining means and said second radial bearing.

5. The swivel connector according to claim 2 in which said sealing means is disposed between said retaining means and said second radial bearing.

6. The swivel connector according to claim 2 in which one of said first and second radial bearings is disposed closer to the centerline of said passages than the other of said first and second radial bearings.

7. The swivel connector according to claim 1 in which said enlarged portion of said first body has a plurality of stepped bores of different diameters forming its inner surface, said reduced portion of said second body has a plurality of stepped outer surfaces of different diameters disposed opposite said stepped bores of said enlarged portion of said first body and surrounded thereby, said first metallic means being disposed in a first of said bores in said enlarged portion of said first body and radially spaced from a first of said outer surfaces of said reduced portion of said second body, said thrust bearing being disposed between said first bore in said enlarged portion of said first body and said first outer surface of said reduced portion of said second body, said second metallic means being disposed on a second of said outer surfaces of said reduced portion of said second body and radially spaced from said first bore in said enlarged portion of said first body, said reduced portion of said second body having a groove in a third of said outer surfaces to receive said retaining means, and said sealing means being disposed between a fourth of said outer surfaces of said reduced portion of said second body and a second of said bores in said enlarged portion of said first body and in engagement with each, said first bore in said enlarged portion of said first body having a larger diameter than said second bore in said enlarged portion of said first body and being closer to the distal end of said enlarged portion of said first body, said first outer surface of said reduced portion of said second body having a larger diameter than said second outer surface of said reduced portion of said second body, said second outer surface of said reduced portion of said second body having a larger diameter than said third outer surface of said reduced portion of said second body and said third outer surface of said reduced portion of said second body having a larger diameter than said fourth outer surface of said reduced portion of said second body.

8. The swivel connector according to claim 7 in which said radial bearing means includes a first radial bearing disposed between said first bore in said enlarged portion of said first body and a fourth of said outer surfaces of said reduced portion of said second body and in engagement therewith and a second radial bearing disposed between said third outer surface of said reduced portion of said second body and said second bore in said enlarged portion of said first body and in engagement therewith, and said fourth outer surface of said reduced portion of said second body having a larger diameter than said first outer surface of said reduced portion of said second body.

9. The swivel connector according to claim 8 in which one of said first and second radial bearings is disposed closer to the centerline of said passages than the other of said first and second radial bearings.

10. The swivel connector according to claim 7 in which said retaining means comprises a ring, said enlarged portion of said first body has a third of said bores between said first and second bores, said third bore in said enlarged portion of said first body has a smaller diameter than said first bore in said enlarged portion of said first body and a larger diameter than said second bore in said enlarged portion of said first body, said groove has a depth greater than the radial distance from the outer circumference of said ring to said third bore in said enlarged portion of said first body when said ring is disposed in said groove to insure that said ring remains within said groove at all times.

11. The swivel connector according to claim 1 including set screws to secure said first metallic means to said enlarged portion of said first body for rotation therewith, and each of said reduced portion of said second body and said second metallic means having flats to secure said second metallic means to said reduced portion of said second body for rotation therewith.

12. The swivel connector according to claim 1 in which said retaining means comprises a ring, said reduced portion of said second body has a groove therein to receive said ring for support thereby, said groove has a depth greater than the radial distance from the outer circumference of said ring to a surrounding portion of the inner surface of said first body when said ring is disposed in said groove to insure that said ring remains within said groove at all times.

13. The swivel connector according to claim 1 in which said thrust bearing has a first surface in engagement with one of said first and second metallic means and a second surface in engagement with the other of said first and second metallic means, and said first and second surfaces of said thrust bearing being substantially parallel to each other and substantially orthogonal to the axis of rotation of said first and second bodies.

14. A swivel connector including a first body adapted to be connected to a nozzle or the like, a second body adapted to be connected to a hose or the like; said first body having an axial bore extending therethrough; said axial bore having a first portion of smaller diameter than the remainder of said axial bore; said second body having a reduced portion for disposition within the remainder of said axial bore in said first body and in radial spaced relation thereto; said second body having a passage extending therethrough and communicating with said first portion of said axial bore in said first body to provide a continuous passage extending through said first and second bodies; means to rotatably connect said first body and said second body to each other against axial separation and disposed between the wall of the remainder of said axial bore in said first body and said reduced portion of said second body, said rotatably connecting means including first metallic means secured to the wall of the remainder of said axial bore in said first body for rotation with said first body and radially spaced from said reduced portion of said second body, second metallic means secured to said reduced portion of said second body for rotation therewith and radially spaced from the wall of the remainder of said axial bore in said first body, a non-metallic thrust bearing disposed between said first metallic means and said second metallic means and in engagement with each while permitting relative rotation therebetween, and radial bearing means disposed between the wall of the remainder of said axial bore in said first body and said reduced portion of said second body and in engagement with each; and sealing means disposed between the wall of the remainder of said axial bore in said first body and said reduced portion of said second body and in engagement with each.

15. The swivel connector according to claim 14 in which said radial bearing means includes a first radial bearing disposed between the wall of the remainder of said axial bore in said first body and said reduced portion of said second body on the side of said first metallic means remote from said thrust bearing and in engagement with said first and second bodies, and a second radial bearing disposed between the wall of the remainder of said axial bore in said first body and said reduced portion of said second body on the side of said second metallic means remote from said thrust bearing and in engagement with said first and second bodies.

16. The swivel connector according to claim 15 in which each of said first and second radial bearings is non-metallic.

17. The swivel according to claim 16 including retaining means supported on said reduced portion of said second body and engaging said second metallic means on a side remote from the side of said second metallic means against which said thrust bearing engages, said retaining means being radially spaced from the wall of the remainder of said axial bore in said first body, and said sealing means being disposed between said retaining means and said second radial bearing.

18. The swivel connector according to claim 15 including retaining means supported on said reduced portion of said second body and engaging said second metallic means on a side remote from the side of said second metallic means against which said thrust bearing engages, said retaining means being radially spaced from the wall of the remainder of said axial bore in said first body, and said sealing means being disposed between said retaining means and said second radial bearing.

19. The swivel connectors according to claim 14 in which the remainder of said axial bore in said first body comprises a plurality of stepped bores of different diameters, said reduced portion of said second body has a plurality of stepped outer surfaces of different diameters disposed opposite said stepped bores in said first body and surrounded thereby, said first metallic means being disposed in a first of said bores in said first body and radially spaced from a first of said outer surfaces of said reduced portion of said second body, said thrust bearing being disposed between said first bore in said first body and said first outer surface of said reduced portion of said second body, said second metallic means being disposed on a second of said outer surfaces of said reduced portion of said second body and radially spaced from said first bore in said first body, and said sealing means being disposed between a third of said outer surfaces of said reduced portion of said second body and a second of said bores in said first body and in engagement with each, said first bore in said first body having a larger diameter than said second bore in said first body and being closer to the end of said first body receiving said reduced portion of said second body, said first outer surface of said reduced portion of said second body having a larger diameter than said second outer surface of said reduced portion of said second body, and said second outer surface of said reduced portion of said second body having a larger diameter than said third outer surface of said reduced portion of said second body.

20. The swivel connector according to claim 19 in which said radial bearing means includes a first radial bearing disposed between said first bore in said first body and a fourth of said outer surfaces of said reduced portion of said second body and in engagement therewith and a second radial bearing disposed between said third outer surface of said reduced portion of said second body and said second bore in said first body and in engagement therewith, and said fourth outer surface of said reduced portion of said second body has a larger diameter than said first outer surface of said reduced portion of said second body.

21. The swivel connector according to claim 19 including said reduced portion of said second body having a fourth of said outer surfaces disposed between said second and third outer surfaces thereof, said fourth outer surface having a larger diameter than said third outer surface and a smaller diameter than said second outer surface, said fourth outer surface having a circumferential groove therein, a ring disposed in said groove for support thereby and engaging said second metallic means on a side remote from the side of said second metallic means against which said thrust bearing engages, said ring being radially spaced from a surrounding portion of the wall of the remainder of said axial bore in said first body, said sealing means being disposed between said ring and said second radial bearing, and said groove having a depth greater than the radial distance from the outer circumference of said ring to the surrounding portion of the wall of the remainder of said axial bore in said first body when said ring is disposed in said groove to insure that said ring remains within said groove at all times.

22. The swivel connector according to claim 14 including set screws to secure said first metallic means to said first body for rotation therewith, and each reduced portion of said second body and said second metallic means having flats to secure said second metallic means to said reduced portion of said second body for rotation therewith.

23. The swivel connector according to claim 14 including said reduced portion of said second body having a fourth of said outer surfaces disposed between said second and third outer surfaces thereof, said fourth outer surface having a larger diameter than said third outer surface and a smaller diameter than said second outer surface, said fourth outer surface having a circumferential groove therein, a ring disposed in said groove for support thereby and engaging said second metallic means on a side remote from the side of said second metallic means against which said thrust bearing engages, said ring being radially spaced from a surrounding portion of the wall of the remainder of said axial bore in said first body, and said sealing means being disposed between said ring and said radial bearing, and said groove having a depth greater than the radial distance from the outer circumference of said ring to the surrounding portion of the remainder of said axial bore in said first body when said ring is disposed in said groove to insure that said ring remains within said groove at all times.

24. The swivel connector according to claim 14 in which said thrust bearing has a first surface in engagement with one of said first and second metallic means and a second surface in engagement with the other of said first and second metallic means, and said first and second surfaces of said thrust bearing being substantially parallel to each other and substantially orthogonal to the axis of rotation of said first and second bodies.

* * * * *